United States Patent
Sechrist

(10) Patent No.: US 8,002,952 B2
(45) Date of Patent: Aug. 23, 2011

(54) HEAT PUMP DISTILLATION

(75) Inventor: Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 907 days.

(21) Appl. No.: 11/934,321

(22) Filed: Nov. 2, 2007

(65) Prior Publication Data

US 2009/0114524 A1 May 7, 2009

(51) Int. Cl.
*B01D 1/28* (2006.01)
*B01D 3/02* (2006.01)
*F25J 3/02* (2006.01)

(52) U.S. Cl. ..... 202/153; 62/238.5; 62/238.7; 62/324.1; 62/510; 159/24.2; 159/46; 202/155; 202/158; 202/172; 202/176; 202/182

(58) Field of Classification Search ............... 62/238.5, 62/238.7, 324.1, 510; 159/24.1, 24.2, 46; 202/153, 155, 158, 172, 176, 182; 203/26, 203/71, 98, DIG. 4

See application file for complete search history.

(56) References Cited

U.S. PATENT DOCUMENTS

| | | | | |
|---|---|---|---|---|
| 3,575,007 A | * | 4/1971 | Gunther | 62/620 |
| 4,234,391 A | * | 11/1980 | Seader | 203/26 |
| 4,277,268 A | * | 7/1981 | Spangler, Jr. | 62/630 |
| 4,737,177 A | * | 4/1988 | Erickson | 62/646 |
| 4,961,826 A | * | 10/1990 | Grethlein et al. | 203/19 |
| 5,000,841 A | | 3/1991 | Owen | |
| 5,351,492 A | * | 10/1994 | Agrawal et al. | 62/648 |
| 5,435,436 A | * | 7/1995 | Manley et al. | 203/74 |
| 5,737,940 A | * | 4/1998 | Yao et al. | 62/620 |
| 6,045,660 A | * | 4/2000 | Savage et al. | 202/172 |
| 6,113,776 A | | 9/2000 | Upson | |
| 6,348,137 B1 | * | 2/2002 | Nommensen | 203/49 |
| 6,558,515 B1 | | 5/2003 | Steacy | |
| 6,605,190 B1 | * | 8/2003 | Salamon et al. | 203/1 |
| 6,682,633 B1 | | 1/2004 | Xu et al. | |
| 7,268,265 B1 | | 9/2007 | Stewart et al. | |
| 7,824,542 B2 | * | 11/2010 | Menzel | 208/341 |
| 2009/0308100 A1 | * | 12/2009 | Jensen | 62/617 |
| 2010/0101930 A1 | * | 4/2010 | Sechrist et al. | 203/27 |
| 2010/0108487 A1 | * | 5/2010 | Townsend | 203/26 |

\* cited by examiner

*Primary Examiner* — Virginia Manoharan
(74) *Attorney, Agent, or Firm* — David J Piasecki

(57) ABSTRACT

A distillation column is disclosed with a folded design. The column includes a plurality of rectification zones and corresponding stripping zones Each rectification zone is linked to a heat pump or a stage of a heat pump. Overhead vapor from the top rectification zone is compressed and used to heat bottoms liquid from the bottom stripping zone. Similarly, overhead vapor from the middle rectification zone is compressed and used to heat liquid from a middle stripping zone and overhead from a lower rectification zone is compressed and used to heat liquid taken from the uppermost or top stripping zone. A single multiple stage heat pump compressor may be utilized as opposed to a plurality of heat pumps Because the heat exchanger from each rectification-stripping zone pair has a lower duty, economical stab-in heat exchangers may be utilized.

13 Claims, 1 Drawing Sheet

HEAT PUMP DISTILLATION

BACKGROUND

1. Technical Field

A distillation process and apparatus is disclosed for separating two or more components having different volatilities from a liquid mixture containing the components. The process and apparatus employs an improved heat pump configuration including multiple heat pumps and multiple reboiler heat exchangers in combination with a folded column design or modified dividing wall column design.

2. Description of the Related Art

Distillation is a method of separation that is based on a difference in composition between a liquid mixture and a vapor formed from the liquid mixture. This difference in composition arises from the dissimilar effective vapor pressures, or volatilities, of the various components of the liquid mixture. Distillation normally involves partial or flash vaporization of the liquid composition followed by condensation of the vaporized material, usually in multiple vaporization/condensation sections known as stages.

The apparatus in which the separating occurs is usually a vertical, cylindrical vessel called a distillation column. Fractional distillation or fractionation involves the collection of separate fractions of condensed vapor, each fraction being segregated thereby permitting an original liquid mixture to be separated into two or more product streams. Rectification involves the enrichment of a lighter stream by intimate contact with counter-flowing liquid reflux within the fractionation column, typically above the feed inlet, which removes heavier materials from the lighter stream. Stripping, on the other hand, involves the enrichment of a heavy stream below the feed by intimate contact with counter-flowing reboil vapors within the column, which removes lighter components from the heavier stream.

Distillation or fractionation columns normally contain internal devices for effecting vapor-liquid contact such as plates, trays or packings. Generally, the larger the number of plates or trays, the better the separation. A theoretical plate or a "theoretical stage" in a distillation process is a hypothetical zone or stage in which two phases, such as the liquid and vapor phases of a mixture, establish equilibrium with each other. The performance of a distillation process depends on having a series of equilibrium stages and is therefore enhanced by increasing the number of theoretical stages (NTS).

The combining of two distillation columns into a single column having a vertical partition, known as a diving wall column (DWC), provides for the separation of the feed into a plurality product streams. The use of DWCs can reduce the size or cost of the equipment needed to produce overhead, bottoms, and sidedraw products. DWC designs and control systems for DWCs are disclosed in U.S. Pat. Nos. 6,558,515 and 7,267,746. Despite the advantages of DWCs, their widespread use has not occurred.

A problem associated with distillation processes in general is the employment of relatively large pieces of equipment that are inefficient with respect to energy consumption. While conventional distillation systems employ a single reboiler at the bottom stage, it is known that energy efficiency could be increased by incorporating capital-intensive reboilers at multiple sections along the column. However, the capital cost of adding multiple reboilers to conventional distillation columns has been cost prohibitive.

Currently, with energy costs increasing, and with national and international pressures to reduce $CO_2$ emissions, there is a recent compelling need for energy efficient distillation column configurations.

SUMMARY OF THE DISCLOSURE

In satisfaction of the above needs, an improved, energy-efficient distillation apparatus is disclosed. The disclosed column which comprises a vessel having a top, a bottom and a continuous sidewall extending therebetween. The vessel is connected to a feed inlet. The vessel comprises a plurality of separation zones including a top rectification zone, a lower rectification zone, a top stripping zone and a bottom stripping zone.

The top rectification zone is connected to a top overhead outlet and the top overhead outlet is connected to a top overhead loop or circuit. The top overhead loop passes through a top heat pump and a bottoms heat exchanger before returning to the column. The bottom stripping zone is connected to a bottoms outlet and the bottoms outlet is connected to a bottoms loop or circuit. The bottoms loop passes through the bottoms heat exchanger where it is heated by the top overhead loop before it returns to the column. Alternatively, the bottoms stripping zone accommodates the bottom heat exchanger in the form of a stab-in heat exchanger.

The lower rectification zone is connected to a lower overhead outlet and the lower overhead outlet is connected to a lower overhead loop or circuit. The lower overhead loop passes through a lower heat pump and a top heat exchanger before returning to the column. The top stripping zone is connected to a top stripping outlet which is connected to a top stripping loop or circuit. The top stripping loop passes through the top heat exchanger where it is heated by the lower overhead loop before returning to column. Alternatively, the top stripping zone accommodates the top heat exchanger in the form of a stab-in heat exchanger.

In a refinement, the column is of a folded design wherein the top rectification zone is disposed laterally adjacent to the top stripping zone with a top dividing wall disposed therebetween and, the lower rectification zone is disposed laterally adjacent to the bottom stripping zone with a lower dividing wall disposed therebetween.

In a refinement, the top overhead loop or top overhead zone is connected to a top rectification zone product outlet.

In another refinement, the bottoms loop or bottoms stripping zone is connected to a bottom stripping zone product outlet.

In another refinement, the lower overhead loop or lower rectification zone is connected to a lower rectification zone product outlet.

In another refinement, the top stripping loop or top stripping zone is connected to a top stripping zone product outlet.

In another refinement, the top heat pump and lower heat pump are separate stages of a multiple stage heat pump.

In another refinement, the lower rectification zone is in fluid communication with the top stripping zone. In a further refinement of this process, liquid from the lower rectification zone is passed to the top stripping zone and vapor from the top stripping zone is passed to the lower rectification zone.

In another refinement, the disclosed distillation apparatus further includes a middle rectification zone and a middle stripping zone. The middle rectification zone is connected to a middle overhead outlet, which is connected to a middle overhead loop or circuit. The middle overhead loop passes through a middle heat pump and a middle heat exchanger before returning to the middle rectification zone. Similarly, the middle stripping zone is connected to a middle stripping outlet, which is connected to a middle stripping loop or circuit. The middle stripping loop passes through the middle heat exchanger where it is heated by the middle overhead loop before returning to the middle stripping zone. Alternatively, the middle stripping zone accommodates the middle heat exchanger in the form of a stab-in heat exchanger.

In a refinement, the middle rectification zone is disposed laterally adjacent to the middle stripping zone with a middle dividing wall disposed therebetween.

In a refinement, the middle rectification loop or middle rectification zone is connected to a middle rectification product outlet.

In another refinement, the middle stripping loop or middle stripping zone is connected to a middle stripping product outlet.

In another refinement, the top, middle and lower heat pumps are separate stages of a multiple stage heat pump.

In another refinement, the distillation apparatus includes a plurality of middle rectification zones and a plurality of middle stripping zones.

In another refinement, each separation zone comprises a plurality of theoretical stages.

In another refinement, the feed is connected to the lower rectification zone.

An improved distillation method is also disclosed for at least partially separating at least one lighter component from at least one heavier component of a mixture comprising the lighter and heaver components. The disclosed method comprises feeding the mixture into a vessel comprising a plurality of separation zones including a top rectification zone, a lower rectification zone, a top stripping zone and a bottom stripping zone. The method further includes passing top overhead material from the top rectification zone through a bottoms heat exchanger to heat the bottoms liquid and cool the top overhead material. The method further includes passing lower overhead material from the lower rectification zone through a top heat exchanger to heat the top stripping liquid and cool the lower overhead material.

In a refinement, the method further includes drawing off at least some of the top overhead material as product while a remainder of the top overhead material is cooled and returned to the column.

In another refinement, the method further includes drawing off at least some of the bottoms liquid as product while a remainder of the bottoms liquid is heated by the overhead material passing through the bottoms heat exchanger.

In another refinement, the method further includes drawing off at least some of the lower overhead material as product while a remainder of the lower overhead material is cooled and returned to the column.

In another refinement, the method further includes drawing off at least some of the top stripping liquid as product while a remainder of the top stripping liquid is heated and returned to the column.

Other advantages and features will be apparent from the following detailed description when read in conjunction with the attached drawings.

BRIEF DESCRIPTION OF THE DRAWINGS

For a more complete understanding of the disclosed method and apparatus, reference should be made to the embodiment illustrated in greater detail on the accompanying drawings, wherein.

Figure 1:
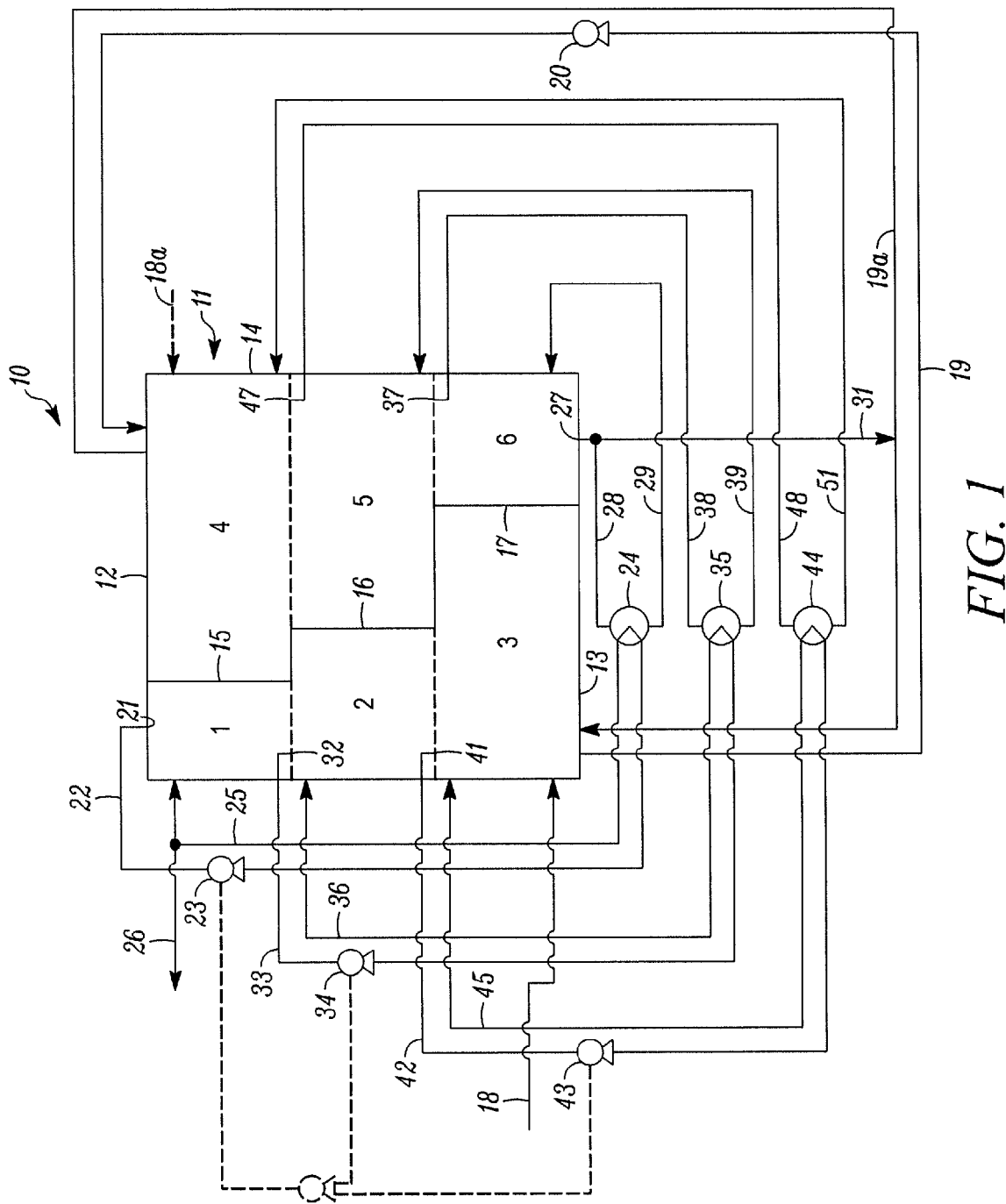
FIG. 1 is a schematic diagram of a folded column design with three rectification zones numbered 1-3 and three stripping zones number 4-6 and the heat pumps and heat exchangers associated with each rectification and stripping zone.

It should be understood that the drawing is not necessarily to scale and that the disclosed embodiment is illustrated schematically. In certain instances, details which are not necessary for an understanding of the disclosed method and apparatus or which render other details difficult to perceive may have been omitted. It should be understood, of course, that this disclosure is not limited to the particular embodiment illustrated herein. For example, this disclosure is obviously not limited to a column with three rectification zones and three stripping zones. A column with mote or less than three of each type of zone falls within the scope of this disclosure.

DETAILED DESCRIPTION OF THE PRESENTLY PREFERRED EMBODIMENTS

A "reversible" distillation process includes an infinite number of theoretical stages and an infinite number of heat sinks disposed above the feed inlet as well as an infinite number of heat sources disposed below the feed inlet, which would result in mono-atomically decreasing vapor rate away from the feed tray which would result in a tapered or conical shape to the upper end of the column. The same would be true for the lower end of the column. Of course, such a design would be cost prohibitive. A reasonable approximation would include a conventional column design with several heat sources disposed above the feed that are matched with a number of corresponding heat sinks or exchangers disposed below the feed. Because not the entire vapor needs to be compressed across the column, at least some energy savings would occur. However, such a construction, with the need to vary the column diameter, would result in a capital outlay that would not be easily recovered with energy savings.

To satisfy the need for a more energy efficient distillation apparatus, the apparatus 10 is disclosed. The apparatus includes a vessel structure 11 equipped with a top 12, a bottom 13 and a side wall 14 In the example shown in FIG. 1, three rectifications zones numbered 1-3 are shown next to three stripping zones numbered 4-6. The uppermost or top rectification zone 1 is disposed adjacent to the top or upper most stripping zone 4 with a dividing wall 15 disposed between the zone 1 and the zone 4. The top rectification zone 1 is in communication with the middle rectification zone 2 as shown by the phantom line between zones 1 and 2. The middle rectification zone 2 is disposed laterally adjacent to the middle stripping zone 5 with a dividing wall 16 disposed between the zone 2 and the zone 5. The middle rectification zone 2 is in communication with the lower rectification zone 3 as shown by the phantom line between zones 2 and 3. The lower rectification zone 3 is disposed laterally next to the bottom stripping zone 6 with a dividing wall 17 separating the zone 3 from the zone 6. The top stripping zone 4 is in communication with the middle stripping zone 5 which is in communication with the bottom stripping zone 6 as shown by the phantom lines between the stripping zones.

The dividing wall structures 15, 16, 17 prevent direct communication between the rectification and stripping zones. Further, the dividing wall structures 15, 16, 17 are not intended to facilitate heat transfer between the rectification zones 1-3 and the stripping zones 4-6.

Liquid material from the lower rectification zone 3 is passed through the line 19 and pump 20 to the top stripping zone 4 as shown in FIG. 1. Conversely, vapor from the upper stripping zone 4 is passed through the line 19*a* to the lower rectification zone 3.

It will be noted that the vessel or column 11 need not be of the folded design shown in FIG. 1. The column 11 may be uptight, with a plurality of heat pumps and reboiler exchangers.

The feed line 18 injects the feed into the lower rectification zone 3. Alternatively, the feed can enter the upper stripping zone 4 as indicated by the line 18a shown in phantom. Each rectification zone 1-3 and each stripping zone 4-6 will include a plurality of theoretically stages, the number of which will vary, depending upon the particular separation being carried out. Further, in the embodiment shown, only three rectification zones 1-3 and three stripping zones 4-6 are shown although the number of rectification zones and the number of stripping zones may vary. Depending upon the particular separation, the number of stripping zones may vary from two to several with a corresponding number of stripping zones. Yet another possibility is to connect the feed to the upper stripping zone 4.

The top rectification zone 1 is connected to a top overhead outlet 21 that is connected to a top overhead line 22 that passes through a top heat pump 23 where the overhead vapors are compressed and pumped through the bottoms heat exchanger 24 before returning to the top rectification zone 1 (or elsewhere) through the return line 25. As seen in FIG. 1, light product may be taken off of the line 25 to the product outlet 26. Hot pressurized vapor passing through the top overhead loop 22, 23, 25, with its increased condensation temperature, is used to heat bottoms liquid from the bottoms stripping zone 6. Specifically, the bottoms stripping zones 6 is connected to a bottoms outlet 27 that is connected to a bottoms loop comprising the line 28 that passes through the bottoms heat exchanger 24 before returning the liquid through the line 29 to the bottoms stripping zone 6 (of elsewhere in the column) as shown. The pressurized vapor from the rectification zone 1, with its elevated condensation temperature, drives the reboiler exchanger 24 resulting in a heating of the bottoms liquid flowing through the lines 28, 29. A bottoms product stream 31 may be taken off of the bottoms loop 28, 29.

Similarly, overhead vapor is taken from the middle rectification zone 2 through the outlet 32 and passed through the middle overhead loop that includes the line 33 that passes through the middle heat pump 34 where the overhead vapor is pressurized before it is passed through the middle heat exchanger 35 and returned to the middle rectification zone (or elsewhere) through the line 36. The heated compressed vapors from the rectification zone 2, with their increased condensation temperature, are used to heat liquid drawn off of the middle stripping zone 5. Specifically, the stripping zone 5 includes a bottoms outlet 37 connected to a line 38 that passes through the middle heat exchanger 35 before returning to the middle stripping zone (or elsewhere) through the line 39.

Finally, the lower rectification section includes an overhead outlet 41 connected to a line 42 that passes through the lower heat pump 43 before passing through the top heat exchanger 44 and returning to the lower rectification zone 43 (or elsewhere) through the return line 45. The pressurized overhead vapor from the overhead rectification zone 3, with its increased condensation temperature, is used to heat bottoms liquid from the top stripping zone 4 which includes a bottoms outlet 47 that is connected to a line 48 that passes through the top heat exchanger 44 before returning to the top stripping zone 4 (or elsewhere) through the return line 51.

As shown in FIG. 1, three heat pump compressors 23, 34 and 43 are shown. However, the heat pump compressors 23, 34 and 43 need not be separate pumps but can be an integrally geared multiple stage type where a motor powers a plurality of wheels with each wheel having a separate inlet and outlet. These multiple stage compressors are known in the art and will not be described in detail here. Because vapor that originates from an intermediate rectifying stage only needs a compression ratio that provides a sufficient temperature driving force when it condenses to boil liquid from an intermediate stripping stage such as 4 or 5, the required power input is smaller as the temperature difference is smaller. Because the duty to split it up between two or more trays or zones, the heat exchangers 24, 35 and 44 may be of a smaller and less expensive type, such as stab-in heat exchangers. If one or more stab-in heat exchangers are used, the associated conduits 22, 25, 28, 29, 33, 36, 38, 39, 42, 45, 48, 51 can be eliminated or considered for schematically illustrating material flow paths in FIG. 1.

The height of the column 11 will be determined by the maximum number of trays between any adjacent compressor suctions 19, 20 or between adjacent intermediate reboilers 24, 35, 44. FIG. 1 shows a column with a single fold with a single pump 20 drawing fluid from a bottom rectification zone 3 to a top stripping zone 4. Multiple folds using multiple pumps like the one shown at 20 for drawing fluid from a lower rectification zone to a top stripping zone are anticipated. Thus, the overall height of the column can be substantially decreased using the disclosed folded design.

The vapor that from the intermediate rectification section 2 that is not compressed by the pump 34 flows into the bottom of the top rectification section 1, and the liquid from the bottom of the intermediate stripping section 5 is pumped to the top of the bottoms stripping section 6. As a result, the column height may be reduced and the total tray area can be reduced, approaching the minimum tray area from the theoretical minimum vapor flow at each tray. Further, because the overall height of the column 14 substantially reduced, installation costs are also reduced.

While only a certain embodiment has been set forth, alternatives and modifications will be apparent from the above description to those skilled in the art. These and other alternatives are considered equivalents and within the spirit and scope of this disclosure and the appended claims.

The invention claimed is:

1. A distillation apparatus comprising:
   a vessel comprising a top, a bottom and a continuous sidewall extending therebetween,
   the vessel being connected to a feed inlet,
   the vessel comprising a plurality of separation zones comprising a top rectification zone, a lower rectification zone, a top stripping zone and a bottoms stripping zone,
   the top rectification zone being connected to a top overhead loop that connects the top rectification zone to a top heat pump and a bottoms heat exchanger, the bottoms stripping zone being connected to the bottoms heat exchanger where bottoms material is heated by material passing through the top overhead loop,
   the lower rectification zone being connected to a lower overhead loop that connects the lower rectification zone to a lower heat pump and a top heat exchanger, the top stripping zone being connected to the top heat exchanger where material from the top stripping zone is heated by material passing through the lower overhead loop;
   wherein the top rectification zone is disposed laterally adjacent to the top stripping zone with a top dividing wall disposed therebetween and the lower rectification zone is disposed laterally adjacent to the bottoms stripping zone with a lower dividing wall disposed therebetween.

2. The distillation apparatus of claim 1 wherein the lower rectification zone and top stripping zone are connected so that vapor from the top stripping zone is passed to the lower rectification zone and liquid from the lower rectification zone is passed to the top stripping zone.

3. The distillation apparatus of claim 1 wherein the top overhead loop is connected to a top rectification zone product outlet.

4. The distillation apparatus of claim 1 wherein the bottoms stripping zone is connected to a bottoms stripping zone product outlet.

5. The distillation apparatus of claim 1 wherein the top heat pump and lower heat pump are separate stages of a multiple stage heat pump.

6. The distillation apparatus of claim 1 further comprising a middle rectification zone and a middle stripping zone, the
- middle rectification zone being disposed laterally adjacent to the middle stripping zone with a middle dividing wall disposed therebetween,
- the middle rectification zone being connected to a middle overhead loop that connects the middle rectification zone to a middle heat pump and a middle heat exchanger, the middle stripping zone being connected to the middle heat exchanger where material from the middle stripping zone is heated by material passing through the middle overhead loop.

7. The distillation apparatus of claim 6 wherein the top, middle and lower heat pumps are separate stages of a multiple stage heat pump.

8. The distillation apparatus of claim 1 wherein each separation zone comprises a plurality of theoretical stages.

9. The distillation apparatus of claim 1 wherein the feed is connected to the lower rectification zone.

10. A distillation apparatus comprising:
- a vessel comprising a top, a bottom and a continuous sidewall extending therebetween,
- the vessel being connected to a feed inlet,
- the vessel comprising a plurality of separation zones comprising a top rectification zone, a lower rectification zone, a top stripping zone, a bottoms stripping zone, a middle rectification zone and a middle stripping zone,
- the top rectification zone being connected to a top overhead loop that connects the top rectification zone to a top heat pump and a bottoms heat exchanger, the bottoms stripping zone being connected to the bottoms heat exchanger where bottoms material is heated by material passing through the top overhead loop,
- the lower rectification zone being connected to a lower overhead loop that connects the lower rectification zone to a lower heat pump and a top heat exchanger, the top stripping zone being connected to the top heat exchanger where material from the top stripping zone is heated by material passing through the lower overhead loop,
- the middle rectification zone being connected to a middle overhead loop that connects the middle rectification zone to a middle heat pump and a middle heat exchanger, the middle stripping zone being connected to the middle heat exchanger where material from the middle stripping zone is heated by material passing through the middle overhead loop.

11. The distillation apparatus of claim 10 wherein the top, middle and lower heat pumps are separate stages of a multiple stage heat pump.

12. The distillation apparatus of claim 10 further comprising a plurality of middle rectification zones and a plurality of middle stripping zones.

13. A distillation apparatus comprising:
- a vessel comprising a top, a bottom and a continuous sidewall extending therebetween,
- the vessel being connected to a feed inlet,
- the vessel comprising a plurality of separation zones comprising a top rectification zone, a lower rectification zone, a top stripping zone and a bottoms stripping zone, each separation zone comprising a plurality of theoretical stages,
- the top rectification zone being disposed laterally adjacent to the top stripping zone with a top dividing wall disposed therebetween, the lower rectification zone being disposed laterally adjacent to the bottoms stripping zone with a lower dividing wall disposed therebetween,
- the top rectification zone being connected to a top overhead loop that that connects the top rectification zone to a top heat pump and a bottoms heat exchanger, the bottoms stripping zone being connected to a the bottoms heat exchanger where bottoms material is heated by material passing through the top overhead loop,
- the top overhead loop being connected to a top product outlet for drawing off light product,
- the bottoms stripping zone being connected to a bottoms product outlet,
- the lower rectification zone being connected to a lower overhead loop that connects the lower rectification zone to a lower heat pump and a top heat exchanger, the top stripping zone being connected to the top heat exchanger where material passing through the top stripping loop is heated by material passing through the lower overhead loop.

* * * * *